United States Patent
Salter et al.

(10) Patent No.: US 9,409,515 B2
(45) Date of Patent: Aug. 9, 2016

(54) LUMINESCENT SEATING ASSEMBLY

(71) Applicant: Ford Global Technologies, LLC, Dearborn, MI (US)

(72) Inventors: Stuart C. Salter, White Lake, MI (US); James J. Surman, Clinton Township, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/719,042

(22) Filed: May 21, 2015

(65) Prior Publication Data
US 2015/0251596 A1 Sep. 10, 2015

Related U.S. Application Data

(63) Continuation-in-part of application No. 14/603,636, filed on Jan. 23, 2015, which is a continuation-in-part of application No. 14/086,442, filed on Nov. 21, 2013.

(51) Int. Cl.
| | |
|---|---|
| *B60Q 1/00* | (2006.01) |
| *B60Q 1/26* | (2006.01) |
| *B60Q 3/02* | (2006.01) |
| *F21V 9/16* | (2006.01) |
| *H05B 37/02* | (2006.01) |
| *B60Q 3/00* | (2006.01) |
| *F21Y 101/02* | (2006.01) |

(52) U.S. Cl.
CPC ............. *B60Q 3/0223* (2013.01); *B60Q 3/001* (2013.01); *B60Q 3/008* (2013.01); *B60Q 3/0243* (2013.01); *B60Q 3/0293* (2013.01); *F21V 9/16* (2013.01); *H05B 37/0218* (2013.01); *H05B 37/0227* (2013.01); *F21Y 2101/02* (2013.01); *Y02B 20/46* (2013.01)

(58) Field of Classification Search
CPC ...... B60Q 3/001; B60Q 3/008; B60Q 3/0223; B60Q 3/0243; B60Q 3/0293; F21V 9/16; H05B 37/0218; H05B 37/0227
USPC .................................. 362/487–488, 509–510
See application file for complete search history.

(56) References Cited

U.S. PATENT DOCUMENTS

| | | |
|---|---|---|
| 4,702,519 A | 10/1987 | Labanoff |
| 6,394,551 B1 | 5/2002 | Beukema |
| 6,729,738 B2 | 5/2004 | Fuwausa et al. |
| 6,773,129 B2 | 8/2004 | Anderson, Jr. et al. |
| 6,871,986 B2 | 3/2005 | Yamanaka et al. |
| 6,990,922 B2 | 1/2006 | Ichikawa et al. |

(Continued)

FOREIGN PATENT DOCUMENTS

| | | |
|---|---|---|
| CN | 201169230 Y | 2/2009 |
| CN | 201193011 Y | 2/2009 |

(Continued)

*Primary Examiner* — Jason Moon Han
(74) *Attorney, Agent, or Firm* — Vichit Chea; Price Heneveld LLP

(57) ABSTRACT

A lighting system for a vehicle headrest is provided herein. The lighting system includes a support attached to a headrest on a first end and removably coupled to a seatback on the opposing end. A light source is disposed on the headrest. A first photoluminescent structure is disposed within the system and is configured to luminesce in response to excitation by the light source. The light source may comprise a plurality of printed LEDs employing a thin configuration.

20 Claims, 12 Drawing Sheets

(56) References Cited

U.S. PATENT DOCUMENTS

| | | |
|---|---|---|
| 7,213,923 B2 | 5/2007 | Liu et al. |
| 7,264,366 B2 | 9/2007 | Hulse |
| 7,264,367 B2 | 9/2007 | Hulse |
| 7,276,854 B1 | 10/2007 | Deutsch et al. |
| 7,753,541 B2 | 7/2010 | Chen et al. |
| 7,834,548 B2 | 11/2010 | Jousse et al. |
| 7,909,398 B2 | 3/2011 | Ling |
| 8,016,465 B2 | 9/2011 | Egerer et al. |
| 8,071,988 B2 | 12/2011 | Lee et al. |
| 8,104,833 B2 | 1/2012 | Koontz, II et al. |
| 8,203,260 B2 | 6/2012 | Li et al. |
| 8,286,378 B2 | 10/2012 | Martin et al. |
| 8,408,766 B2 | 4/2013 | Wilson et al. |
| 8,421,811 B2 | 4/2013 | Odland et al. |
| 8,466,438 B2 | 6/2013 | Lambert et al. |
| 8,519,362 B2 | 8/2013 | Labrot et al. |
| 8,606,430 B2 | 12/2013 | Seder et al. |
| 8,631,598 B2 | 1/2014 | Li et al. |
| 8,724,054 B2 | 5/2014 | Jones |
| 8,773,012 B2 | 7/2014 | Ryu et al. |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2009/0219730 A1 | 9/2009 | Syfert et al. |
| 2012/0001406 A1 | 1/2012 | Paxton et al. |
| 2013/0335994 A1 | 12/2013 | Mulder et al. |
| 2014/0266666 A1 | 9/2014 | Habibi |

FOREIGN PATENT DOCUMENTS

| | | |
|---|---|---|
| DE | 29708699 U1 | 7/1997 |
| DE | 10319396 A1 | 11/2004 |
| EP | 1245444 A1 | 10/2002 |
| EP | 1793261 A1 | 6/2007 |
| EP | 2778209 A1 | 9/2014 |
| JP | 2000159011 A | 6/2000 |
| WO | 2006047306 A1 | 5/2006 |
| WO | 2014068440 A1 | 5/2014 |

LUMINESCENT SEATING ASSEMBLY

CROSS-REFERENCE TO RELATED APPLICATIONS

This application is a continuation-in-part of U.S. patent application Ser. No. 14/603,636, filed Jan. 23, 2015, entitled "DOOR ILLUMINATION AND WARNING SYSTEM," which is a continuation-in-part of U.S. patent application Ser. No. 14/086,442, filed Nov. 21, 2013, entitled "VEHICLE LIGHTING SYSTEM WITH PHOTOLUMINESCENT STRUCTURE." The aforementioned related applications are hereby incorporated by reference as if fully set forth herein.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a lighting system for a vehicle headrest is provided. The lighting system includes a light source disposed on the headrest. A first photoluminescent structure is disposed within the lighting system and configured to luminesce in response to excitation by the light source.

According to another aspect of the present invention, a headrest for a vehicle is provided. The headrest includes a body portion defined by an exterior shell. A light source having a portion thereof is disposed within the shell. A luminescent structure is configured to luminesce in response to excitation by at least a portion of the light source. A controller is configured to control an activation state of the light source.

According to yet another aspect of the present invention, a lighting system for a vehicle seating assembly is provided. The lighting system includes a light source disposed within the seating assembly. A first photoluminescent structure is disposed on the light source. A second photoluminescent structure is disposed on a component proximate the seating assembly. The first and second photoluminescent structures are configured to luminesce in response to excitation by light output from at least a portion of the light source.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lighting system configured to illuminate an area disposed proximate a rear portion of a headrest. The lighting system may advantageously employ one or more photoluminescent structures to illuminate in response to pre-defined events. The one or more photoluminescent structures may be configured to convert light received from an associated light source and re-emit the light at a different wavelength typically found in the visible spectrum. In some embodiments, the light source may implement a thin design, thereby helping to fit the light source into small package spaces of the vehicle where traditional light sources may not be practicable.

Figure 1:
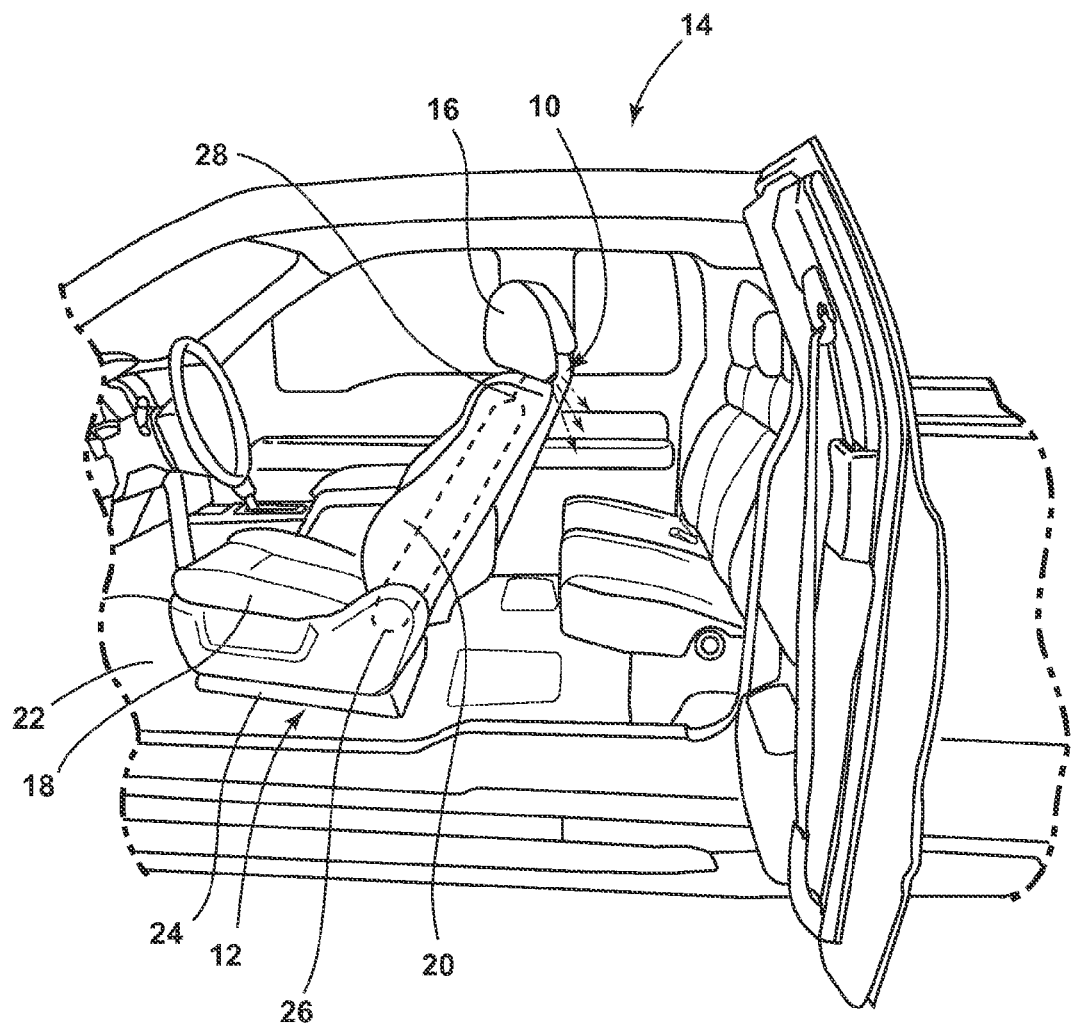
FIG. 1 illustrates a perspective view of a vehicle interior employing an illumination system in a seating assembly according to one embodiment.

Referring to FIG. 1, a lighting system 10 is disposed within the seating assembly 12 of a vehicle 14 that is configured to illuminate an area proximate the seating assembly 12, according to one embodiment. As shown, the lighting system 10 may be disposed on a vehicle headrest that is positioned in a driver side location of the vehicle 14. The vehicle seating assembly 12 includes a seat 18 pivotally coupled with a seatback 20. The seat 18 is slidably coupled with a floor 22 of the vehicle 14 about a track assembly 24. The track assembly is configured to allow the vehicle seating assembly 12 to be adjusted in a forward and a rearward direction relative to the vehicle 14. It is understood that the vehicle seating assembly 12 may be positioned at various locations through the vehicle 14 other than the illustrated position, such as passenger side location, a mid-row location, and rear seat location. It is also conceivable that the seat 18 may not include the track assembly 24 and alternatively may be fixedly coupled with the floor 22 of the vehicle 14. Further, it should be appreciated, however, that the lighting system 10 described herein may be utilized on any portion of any seating assembly 12 disposed within a vehicle 14.

The seatback 20 of the seating assembly 12 may also include side supports 26 that pivotally couple with a rear portion of the seat 18 and extend upward from the seat 18 to a top portion of the seatback 20. The seatback 20 also includes a cushion and an upholstery material disposed over the cushion substantially enclosing the seatback 20. The headrest 16 is removably and adjustably coupled with the top portion of the seatback 20 and is substantially centered therein. Accordingly, an attachment structure 28 for the headrest 16, as illustrated, includes the seatback 20 and more specifically, the upper portion of the seatback 20. It is conceivable that the seatback 20 may be alternatively shaped and constructed with various materials as generally understood in the art. It is also conceivable that the attachment structure 28 may include a rear bulkhead of a vehicle passenger compartment, a rear dash of a passenger car, a rear wall of a truck cabin, or other conceivable vehicle attachment structures for the headrest 16.

Figure 2:
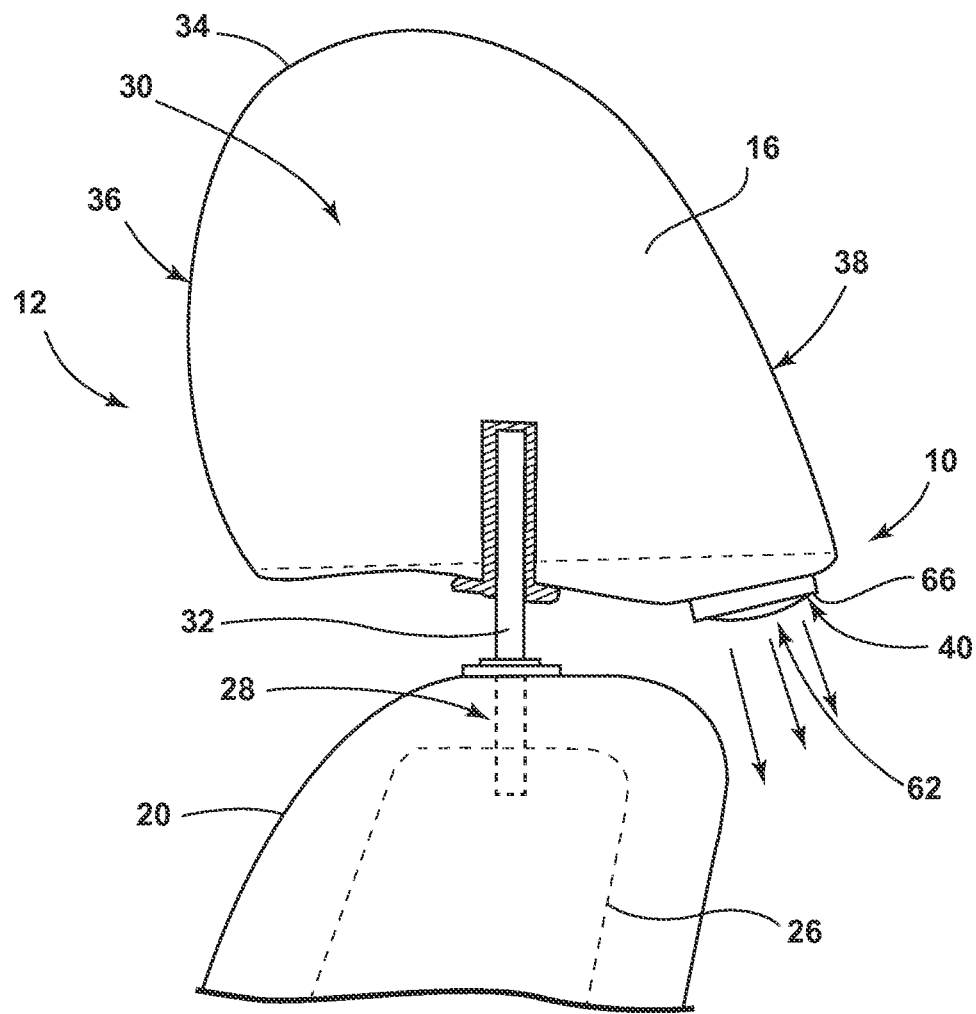
FIG. 2 is a cross-sectional view of the seating assembly showing the headrest lighting.

As shown in the embodiment illustrated in FIG. 2, the headrest 16 generally has a body portion 30 positioned above and supported by a headrest support 32. The body portion 30 includes the cover stock shell 34 that substantially encloses an injection cavity. The cover stock shell 34 is comprised of panels of cover stock material that are joined to form the cover stock shell 34. The panels of cover stock material may include a fabric material, a leather material, a vinyl material, a synthetic material, or other vehicle upholstery materials, and further may include a substantially similar material to the upholstery material covering the seatback 20 and the seat 18 of the vehicle seating assembly 12. The body portion 30 has an exterior surface including a head support surface 36 that is generally forward facing to support a passenger's head. The exterior surface of the body portion 30 also has opposing side surfaces and a rear surface 38 to define an exterior portion of the cover stock shell 34. The cover stock may be stitched to form seams with a thread element comprising cotton, polyester, nylon, metal wire, monofilament, or combinations thereof. The permeable seam may also conceivably include other fastening features, such as an adhesive or a heat welded bond. It is should be appreciated that the panels of cover stock material may be alternative shaped or constructed, such that the seams may be eliminated or alternately configured.

The headrest support 32 extends into the body portion 30 of the headrest 16 on a first portion. A second, opposing exterior portion of the headrest support 32 extends away from the body portion 30 to couple with the attachment structure 28 disposed within a portion of the seatback 20. Moreover, the headrest support 32 may comprise a solid material, or alternatively, may be hollow such that any wiring for the lighting system 10 may be disposed within the headrest support 32.

A light source 40 may be disposed on and/or within the headrest 16 generally on the bottom side of the rear edge. The light source 40 is oriented to emit light downward and rearward of the headrest 16. According to one embodiment, the light source 40 includes a flexible circuit board (e.g., a copper flexible circuit) that is coupled to the body portion 30 of the headrest. In such an arrangement, the flexible circuit board may flex in conjunction with the body portion 30 to allow the lighting system 10 to be contoured to the body portion 30.

A photoluminescent structure 62 may be applied or otherwise arranged on and/or proximate the light source 40. One or more light sources 40 may be disposed within the lighting system 10 and configured to emit light towards a target location. More specifically, light emitted from the light source 40 towards the target location may be converted by the photoluminescent structure 62 and re-emitted as light having a different wavelength, typically in the visible spectrum. According to the illustrated embodiment, the target location is an area disposed downward and rearward of the seatback 20. Such a configuration may minimize distraction to a driver or other passengers within the vehicle 14 when the lighting system 10 is in the illuminated state. It is contemplated that the illumination system 10 may have a wide range of target locations such that the lighting system 10 may be used for a plurality of functions. Exemplary functions include usage as an entry lamp, ambient lighting, task lighting for an occupant, and/or a seat pocket lamp. It should also be appreciated that optics 116 may be utilized to further minimize distraction to additional occupants of the vehicle 14. For example, optics 116 may be submarine mounted to keep light emitted from the lighting system 10 out of the eyes of any and/or all occupants of the vehicle 14.

The light source 40 may be over molded, or otherwise attached, to a portion of the headrest 16, such as a downward and/or rearward facing location of the body portion 30. According to the embodiment illustrated in FIG. 2, the cover stock shell 34 and the light source 40 are placed in a mold simultaneously and an overmold material 66 is disposed over the combination of the cover stock and light source 40. In embodiments where the overmold material 66 is cured under pressure, the overmold material 66 may be applied to the cover stock in a partly-cured condition. In one embodiment the over molding process includes applying the overmold material 66 onto at least a part of over the combination of the headrest 16 and light source 40 by spraying, brushing, dipping, printing, laminating or rolling, followed by curing the overmold material 66. Such a process results in the door seal and light source 40 being coupled to one another. In some embodiments, the overmold material 66 may include a plastic, silicon, urethane material, or any other material that may be advantageous or structurally sound for placement within a head impact zone.

Figure 3A:
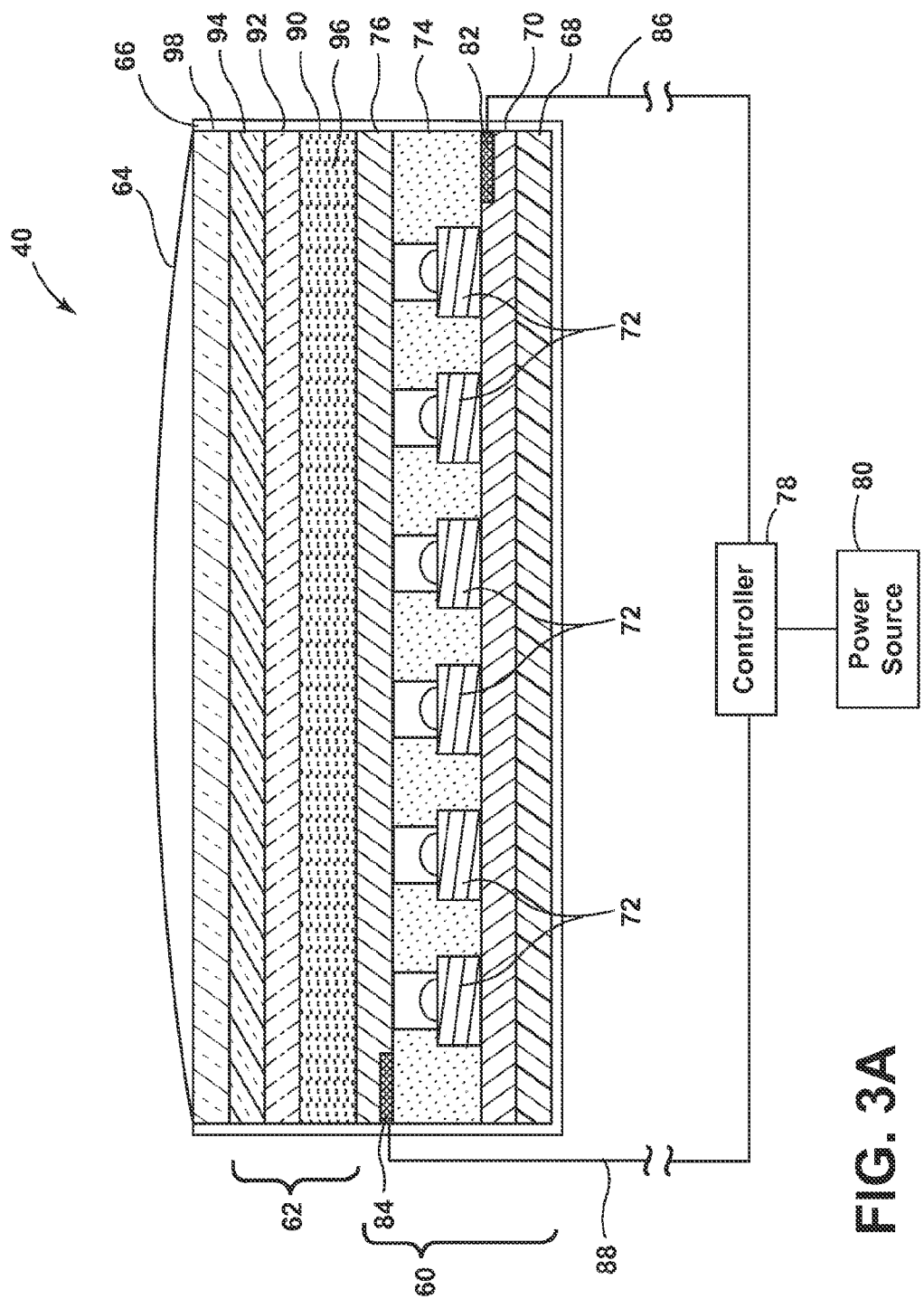
FIG. 3A is a cross-sectional view taken along line III-III of FIG. 2 illustrating a light source according to one embodiment.

Referring to FIGS. 3A-3E, a cross-sectional view of the light source 40 capable of use on a vehicle 14 with an external photoluminescent structure 62 is shown according to one embodiment. As illustrated in FIG. 3A, the light source 40 may have a stacked arrangement that includes a light-producing assembly 60, a photoluminescent structure 62, a viewable portion 64, and an overmold material 66. It should be appreciated that the viewable portion 64 and the overmold material 66 may be two separate components, or may be integrally formed as a single component.

The light-producing assembly 60 may correspond to a thin-film or printed light emitting diode (LED) assembly and includes a substrate 68 as its lowermost layer. The substrate 68 may include a polycarbonate, poly-methyl methacrylate (PMMA), or polyethylene terephthalate (PET) material on the order of 0.005 to 0.060 inches thick and is arranged over the intended vehicle 14 surface on which the light source 40 is to be received (e.g., cover stock shell 34). Alternatively, as a cost saving measure, the substrate 68 may directly correspond to a preexisting vehicle structure (e.g., cover stock shell 34, exterior panels, and/or interior panels).

The light-producing assembly 60 includes a positive electrode 70 arranged over the substrate 68. The positive electrode 70 includes a conductive epoxy such as, but not limited to, a silver-containing or copper-containing epoxy. The positive electrode 70 is electrically connected to at least a portion of a plurality of LED sources 72 arranged within a semiconductor ink 74 and applied over the positive electrode 70. Likewise, a negative electrode 76 is also electrically connected to at least a portion of the LED sources 72. The negative electrode 76 is arranged over the semiconductor ink 74 and includes a transparent or translucent conductive material such as, but not limited to, indium tin oxide. Additionally, each of the positive and negative electrodes 70, 76 are electrically connected to a controller 78 and a power source 80 via a corresponding bus bar 82, 84 and conductive leads 86, 88. The bus bars 82, 84 may be printed along opposite edges of the positive and negative electrodes 70, 76 and the points of connection between the bus bars 82, 84 and the conductive leads 86, 88 may be at opposite corners of each bus bar 82, 84 to promote uniform current distribution along the bus bars. It should be appreciated that in alternate embodiments, the orientation of components within the light-producing assembly 60 may be altered without departing from the concepts of the present disclosure. For example, the negative electrode 76 may be disposed below the semiconductor ink 74 and the positive electrode 76 may be arranged over the aforementioned semiconductor ink 74. Likewise, additional components, such as the bus bars 82, 84 may also be placed in any orientation such that the light-producing assembly 60 may emit light 100 towards a desired location.

The LED sources 72 may be dispersed in a random or controlled fashion within the semiconductor ink 74 and may be configured to emit focused or non-focused light toward the photoluminescent structure 62. The LED sources 72 may correspond to micro-LEDs of gallium nitride elements on the order of about 5 to about 400 microns in size and the semiconductor ink 74 may include various binders and dielectric material including, but not limited to, one or more of gallium, indium, silicon carbide, phosphorous, and/or translucent polymeric binders.

The semiconductor ink 74 can be applied through various printing processes, including ink jet and silk screen processes to selected portion(s) of the positive electrode 70. More specifically, it is envisioned that the LED sources 72 are dispersed within the semiconductor ink 74, and shaped and sized such that a substantial quantity of the LED sources 72 align with the positive and negative electrodes 70, 76 during deposition of the semiconductor ink 74. The portion of the LED sources 72 that ultimately are electrically connected to the positive and negative electrodes 70, 76 may be illuminated by a combination of the bus bars 82, 84, controller 78, power source 80, and conductive leads 86, 88. According to one embodiment, the power source 80 may correspond to a vehicular power source 80 operating at 12 to 16 VDC. Additional information regarding the construction of light-producing assemblies is disclosed in U.S. Patent Publication No. 2014/0264396 A1 to Lowenthal et al., entitled "ULTRA-THIN PRINTED LED LAYER REMOVED FROM SUBSTRATE," filed Mar. 12, 2014, the entire disclosure of which is incorporated herein by reference.

Referring still to FIG. 3A, the photoluminescent structure 62 is arranged over the negative electrode 76 as a coating, layer, film or other suitable deposition. With respect to the presently illustrated embodiment, the photoluminescent structure 62 may be arranged as a multi-layered structure including an energy conversion layer 90, optional stability layer 92, and optional protection layer 94.

The energy conversion layer 90 includes at least one photoluminescent material 96 having energy converting elements with phosphorescent or fluorescent properties. For example, the photoluminescent material 96 may include organic or inorganic fluorescent dyes including rylenes, xanthenes, porphyrins, phthalocyanines. Additionally, or alternatively, the photoluminescent material 96 may include phosphors from the group of Ce-doped garnets such as YAG:Ce. The energy conversion layer 90 may be prepared by dispersing the photoluminescent material 96 in a polymer matrix to form a homogenous mixture using a variety of methods. Such methods may include preparing the energy conversion layer 90 from a formulation in a liquid carrier medium and coating the energy conversion layer 90 to the negative electrode 76 or other desired substrate 68. The energy conversion layer 90 may be applied to the negative electrode 76 by painting, screen printing, flexography, spraying, slot coating, dip coating, roller coating, bar coating, and/or any other methods known in the art. Alternatively, the energy conversion layer 90 may be prepared by methods that do not use a liquid carrier medium. For example, the energy conversion layer 90 may be rendered by dispersing the photoluminescent material 96 into a solid state solution (homogenous mixture in a dry state) that may be incorporated in a polymer matrix formed by extrusion, injection seal, compression seal, calendaring, thermoforming, etc.

To protect the photoluminescent material 96 contained within the energy conversion layer 90 from photolytic and thermal degradation, the photoluminescent structure 62 may include the stability layer 92. The stability layer 92 may be configured as a separate layer optically coupled and adhered to the energy conversion layer 90 or otherwise integrated therewith. The photoluminescent structure 62 may also include the protection layer 94 optically coupled and adhered to the stability layer 92 or other layer (e.g., the energy conversion layer 90 in the absence of the stability layer 92) to protect the photoluminescent structure 62 from physical and chemical damage arising from environmental exposure. The stability layer 92 and/or the protection layer 94 may be combined with the energy conversion layer 90 through sequential coating or printing of each layer, sequential lamination or embossing, or any other suitable means. Additional information regarding the construction of photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

In operation, the photoluminescent material 96 is formulated to become excited upon receiving inputted light of a specific wavelength from at least a portion of the LED sources 72 of the light-producing assembly 60. As a result, the inputted light undergoes an energy conversion process and is re-emitted at a different wavelength. According to one embodiment, the photoluminescent material 96 may be formulated to convert inputted light into a longer wavelength light, otherwise known as down conversion. Alternatively, the photoluminescent material 96 may be formulated to convert inputted light into a shorter wavelength light, otherwise known as up conversion. Under either approach, light converted by the photoluminescent material 96 may be immediately outputted from the photoluminescent structure 62 or otherwise used in an energy cascade, wherein the converted light serves as inputted light to excite another formulation of photoluminescent material 96 located within the energy conversion layer 90, whereby the subsequent converted light may then be outputted from the photoluminescent structure 62 or used as inputted light, and so on. With respect to the energy conversion processes described herein, the difference in wavelength between the inputted light 100 and the converted light 102 is known as the Stokes shift and serves as the principle driving mechanism for an energy conversion process corresponding to a change in wavelength of light.

With continued reference to FIG. 3A, the viewable portion 64 is arranged over the photoluminescent structure 62. In some embodiments, the viewable portion 64 may include a plastic, silicon, or urethane material and is molded over the photoluminescent structure 62 and light-producing assembly 60. Preferably, the viewable portion 64 should be at least partially light transmissible. In this manner, the viewable portion 64 will be illuminated by the photoluminescent structure 62 whenever an energy conversion process is underway. Additionally, by over-sealing the viewable portion 64, it may also function to protect the photoluminescent structure 62 and the light-producing assembly 60. The viewable portion 64 may be arranged in a planar shape and/or an arcuate shape to enhance its viewing potential when in a luminescent state. Like the photoluminescent structure 62 and the light-producing assembly 60, the viewable portion 64 may also benefit from a thin design, thereby helping to fit the light source 40 into small package spaces of the vehicle 14.

In some embodiments, a decorative layer 98 may be disposed between the viewable portion 64 and the photoluminescent structure 62. The decorative layer 98 may include a polymeric material or other suitable material and is configured to control or modify an appearance of the viewable portion 64 of the light source 40. For example, the decorative layer 98 may be configured to confer a metallic appearance to the viewable portion 64 when the viewable portion 64 is in an unilluminated state. In other embodiments, the decorative layer 98 may be tinted any color to complement the vehicle structure on which the light source 40 is to be received. For example, the decorative layer 98 may be similar in color to that of the headrest 16 so that the illumination system is substantially hidden when in the unilluminated state. In any event, the decorative layer 98 should be at least partially light transmissible such that the photoluminescent structure 62 is not prevented from illuminating the viewable portion 64 whenever an energy conversion process is underway.

The overmold material 66 is disposed around the light-producing assembly 60 and photoluminescent structure 62. The overmold material 66 may protect the light-producing assembly 60 from a physical and chemical damage arising from environmental exposure. The overmold material 66 may have viscoelasticity (i.e., having both viscosity and elasticity), a low Young's modulus, and/or a high failure strain compared with other materials so that the overmold material 66 may protect the light-producing assembly 60 when contact is made thereto. For example, the overmold material 66 may protect the light-producing assembly 60 from the repetitive strikes that may occur when the occupants ingress and egress from the vehicle 14.

In some embodiments, the photoluminescent structure 62 may be employed separate and away from the light-producing assembly 60. For example, the photoluminescent structure 62 may be positioned on a vehicle component or surface proximate, but not in physical contact, with the light-producing assembly 60, as will be described in more detail below. It should be understood that in embodiments where the photoluminescent structure 62 is incorporated into distinct components separated from the light source 40, the light source 40 may still have the same or similar structure to the light source 40 described in reference to FIG. 3A.

Figure 3B:
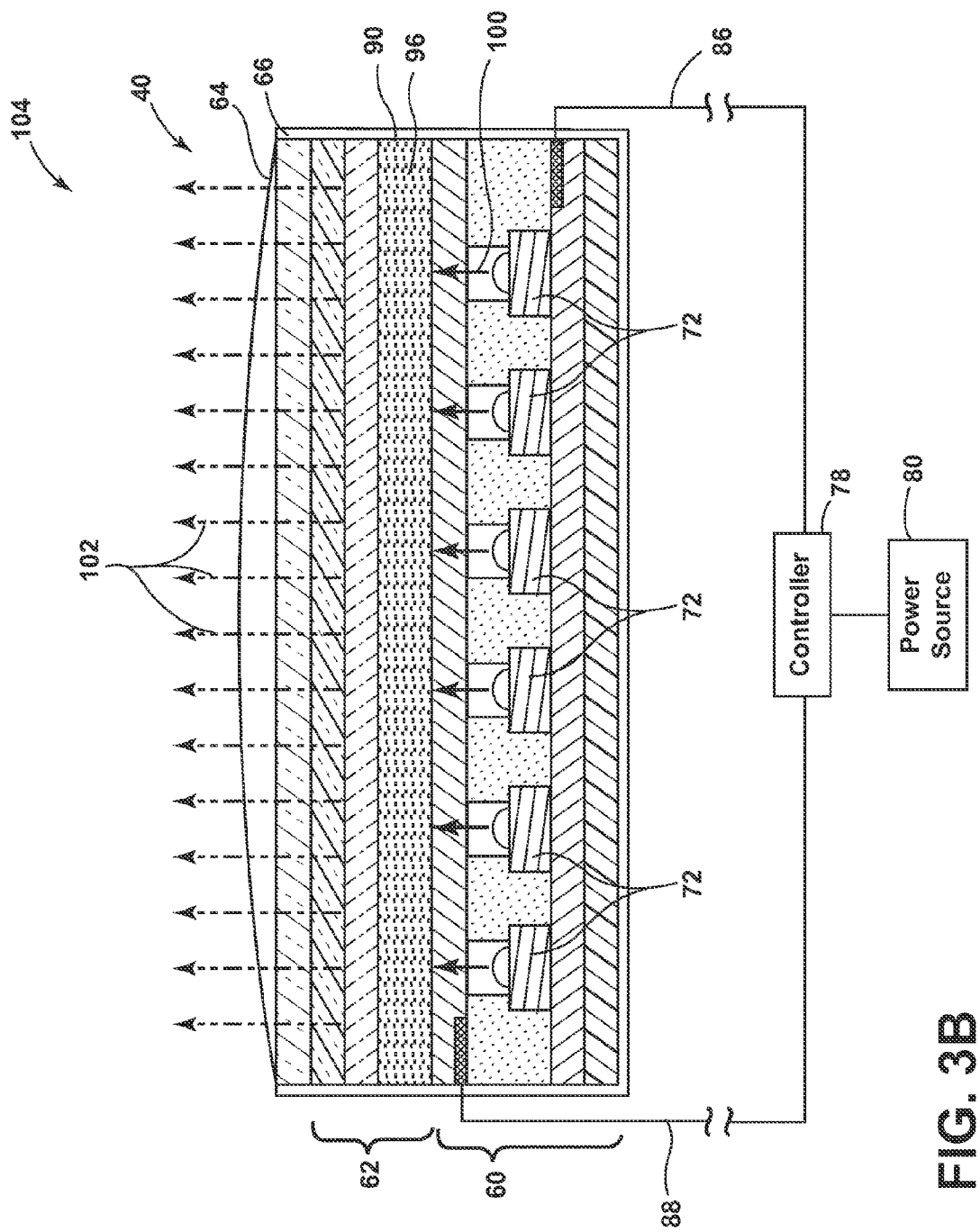
FIG. 3B is a cross-sectional view taken along line III-III of FIG. 2 further illustrating an the light source, according to one embodiment.

Referring to FIG. 3B, an energy conversion process 104 for producing single color luminescence is illustrated according to one embodiment. For purposes of illustration, the energy conversion process 104 is described below using the light source 40 depicted in FIG. 3A. In this embodiment, the energy conversion layer 90 of the photoluminescent structure 62 includes a single photoluminescent material 96, which is configured to convert inputted light 100 received from LED sources 72 into an outputted light 102 having a wavelength different than that associated with the inputted light 100. More specifically, the photoluminescent material 96 is formulated to have an absorption spectrum that includes the emission wavelength of the inputted light 100 supplied from the LED sources 72. The photoluminescent material 96 is also formulated to have a Stokes shift resulting in the converted visible light 102 having an emission spectrum expressed in a desired color, which may vary per lighting application. The converted visible light 102 is outputted from the light source 40 via the viewable portion 64, thereby causing the viewable portion 64 to illuminate in the desired color. In one embodiment, the energy conversion process is undertaken by way of down conversion, whereby the inputted light 100 includes light on the lower end of the visibility spectrum such as blue, violet, or ultraviolet (UV) light. Doing so enables blue, violet, or UV LEDs to be used as the LED sources 72, which may offer a relative cost advantage over simply using LEDs of the desired color and foregoing the energy conversion process altogether. Furthermore, the illumination provided by the viewable portion 64 may offer a unique, substantially uniform, and/or attractive viewing experience that may be difficult to duplicate through non-photoluminescent means.

Figure 3C:
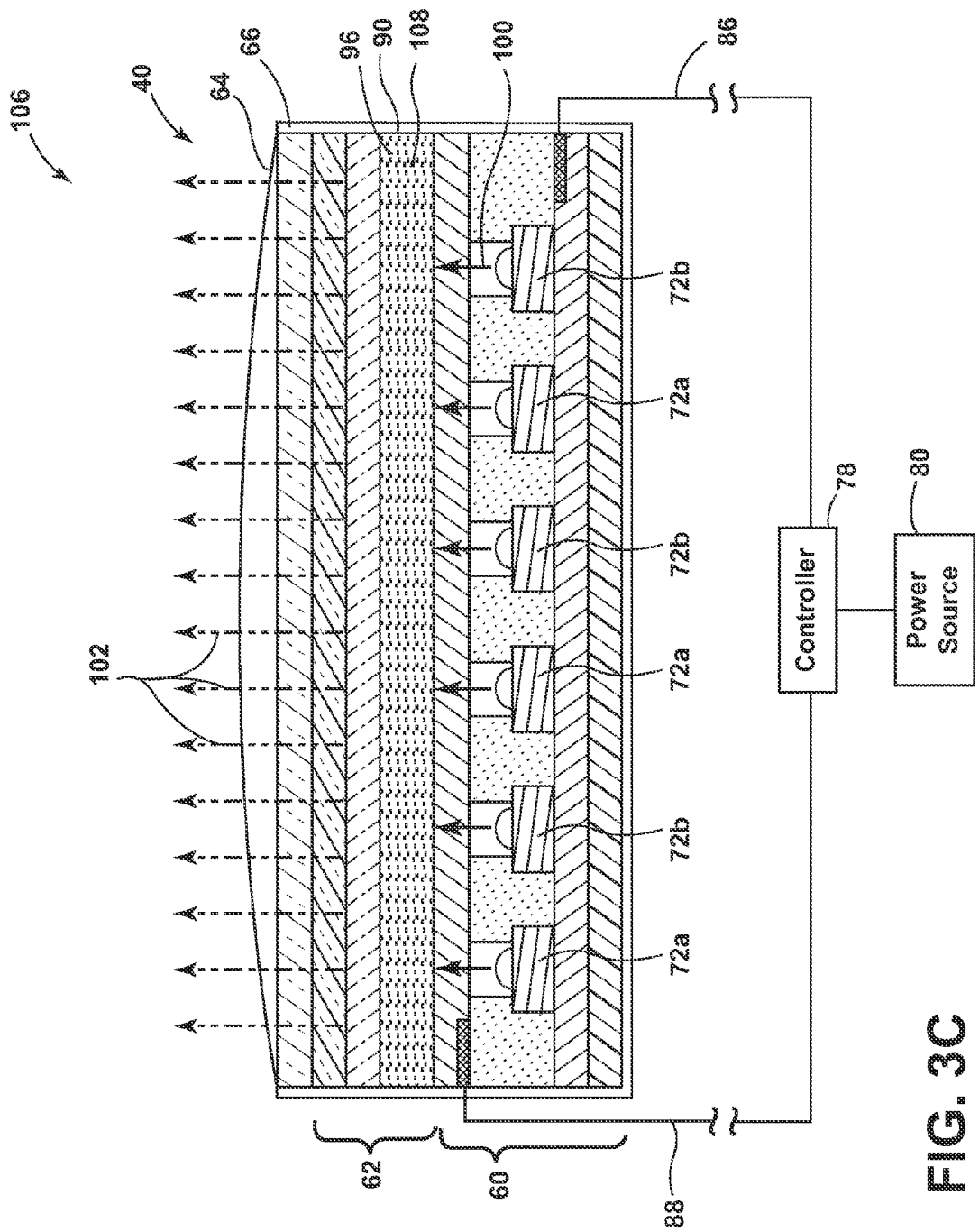
FIG. 3C is a cross-sectional view taken along line III-III of FIG. 2 illustrating an alternate light source, according to one embodiment.

Referring to FIG. 3C, a second energy conversion process 106 for generating multiple colors of light is illustrated according to one embodiment. For consistency, the second energy conversion process 106 is also described below using the light source 40 depicted in FIG. 3A. In this embodiment, the energy conversion layer 90 includes the first and second photoluminescent materials 96, 108 that are interspersed within the energy conversion layer 90. Alternatively, the photoluminescent materials 96, 108 may be isolated from each other if desired. Also, it should be appreciated that the energy conversion layer 90 may include more than two different photoluminescent materials 96, 108, in which case, the teachings provided below similarly apply. In one embodiment, the second energy conversion process 106 occurs by way of down conversion using blue, violet, and/or UV light as the source of excitation.

With respect to the presently illustrated embodiment, the excitation of photoluminescent materials 96, 108 is mutually exclusive. That is, photoluminescent materials 96, 108 are formulated to have non-overlapping absorption spectrums and Stoke shifts that yield different emission spectrums. Also, in formulating the photoluminescent materials 96, 108, care should be taken in choosing the associated Stoke shifts such that the converted light 102 emitted from one of the photoluminescent materials 96, 108, does not excite the other, unless so desired. According to one exemplary embodiment, a first portion of the LED sources 72, exemplarily shown as LED sources 72a, is configured to emit an inputted light 100 having an emission wavelength that only excites photoluminescent material 96 and results in the inputted light 100 being converted into a visible light 102 of a first color (e.g., white). Likewise, a second portion of the LED sources 72, exemplarily shown as LED sources 72b, is configured to emit an inputted light 100 having an emission wavelength that only excites second photoluminescent material 108 and results in the inputted light 100 being converted into a visible light 102 of a second color (e.g., red). Preferably, the first and second colors are visually distinguishable from one another. In this manner, LED sources 72a and 72b may be selectively activated using the controller 78 to cause the photoluminescent structure 62 to luminesce in a variety of colors. For example, the controller 78 may activate only LED sources 72a to exclusively excite photoluminescent material 96, resulting in the viewable portion 64 illuminating in the first color. Alternatively, the controller 78 may activate only LED sources 72b to exclusively excite the second photoluminescent material 108, resulting in the viewable portion 64 illuminating in the second color.

Alternatively still, the controller 78 may activate LED sources 72a and 72b in concert, which causes both of the photoluminescent materials 96, 108 to become excited, resulting in the viewable portion 64 illuminating in a third color, which is a color mixture of the first and second color (e.g., pinkish). The intensities of the inputted light 100 emitted from each light source 40 may also be proportionally varied to one another such that additional colors may be obtained. For energy conversion layers containing more than two distinct photoluminescent materials, a greater diversity of colors may be achieved. Contemplated colors include red, green, blue, and combinations thereof, including white, all of which may be achieved by selecting the appropriate photoluminescent materials and correctly manipulating their corresponding LED sources 72.

Figure 3D:
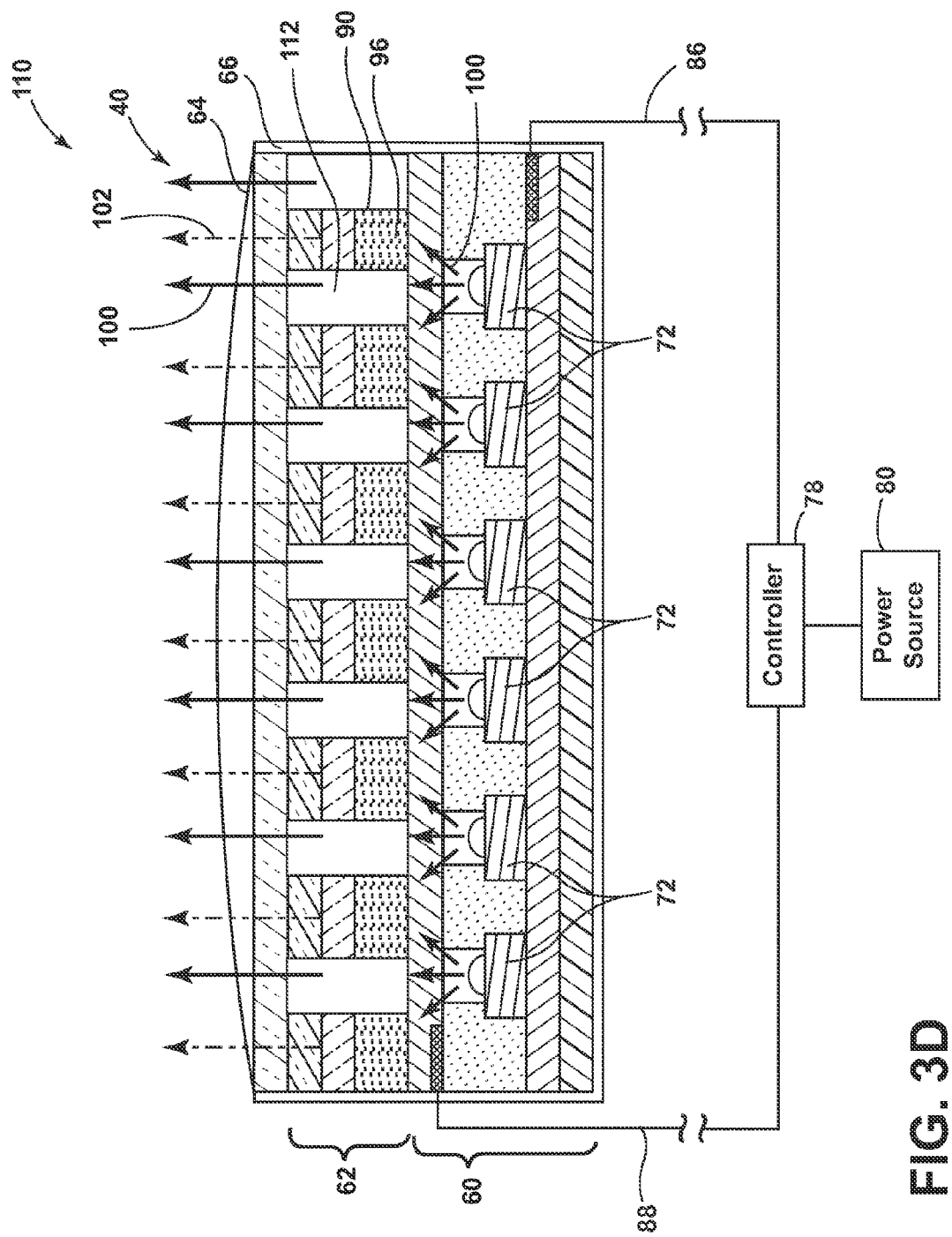
FIG. 3D is a cross-sectional view taken along line III-III of FIG. 2 illustrating a light source having a luminescent structure separated by light transmissive portions disposed on the light source, according to one embodiment.

Referring to FIG. 3D, a third energy conversion process 110 includes a light-producing assembly 60, such as the one described in reference to FIG. 3A, and a photoluminescent structure 62 disposed thereon is illustrated, according to an alternate embodiment. The photoluminescent structure 62 is configured to convert inputted light 100 received from LED sources 72 into a visible light 102 having a wavelength different than that associated with the inputted light 100. More specifically, the photoluminescent structure 62 is formulated to have an absorption spectrum that includes the emission wavelength of the inputted light 100 supplied from the LED sources 72. The photoluminescent material 96 is also formulated to have a Stokes shift resulting in the converted visible light 102 having an emission spectrum expressed in a desired color, which may vary per lighting application.

The photoluminescent structure 62 may be applied to only a portion of the light-producing assembly 60, for example, in a stripped manner. Between the photoluminescent structures 62 may be light transmissive portions 112 that allow inputted light 100 emitted from the LED sources 72 to pass therethrough at the first wavelength. The light transmissive portions 112 may be an open space, or may be a transparent or translucent material. The light 100 emitted through the light transmissive portions 112 may be directed from the light-producing assembly 60 towards a second photoluminescent structure 140 disposed proximate to the light-producing assembly 60. The second photoluminescent structure 140 may be configured to luminesce in response to the inputted light 100 that is directed through the light transmissive portions 112.

Figure 3E:
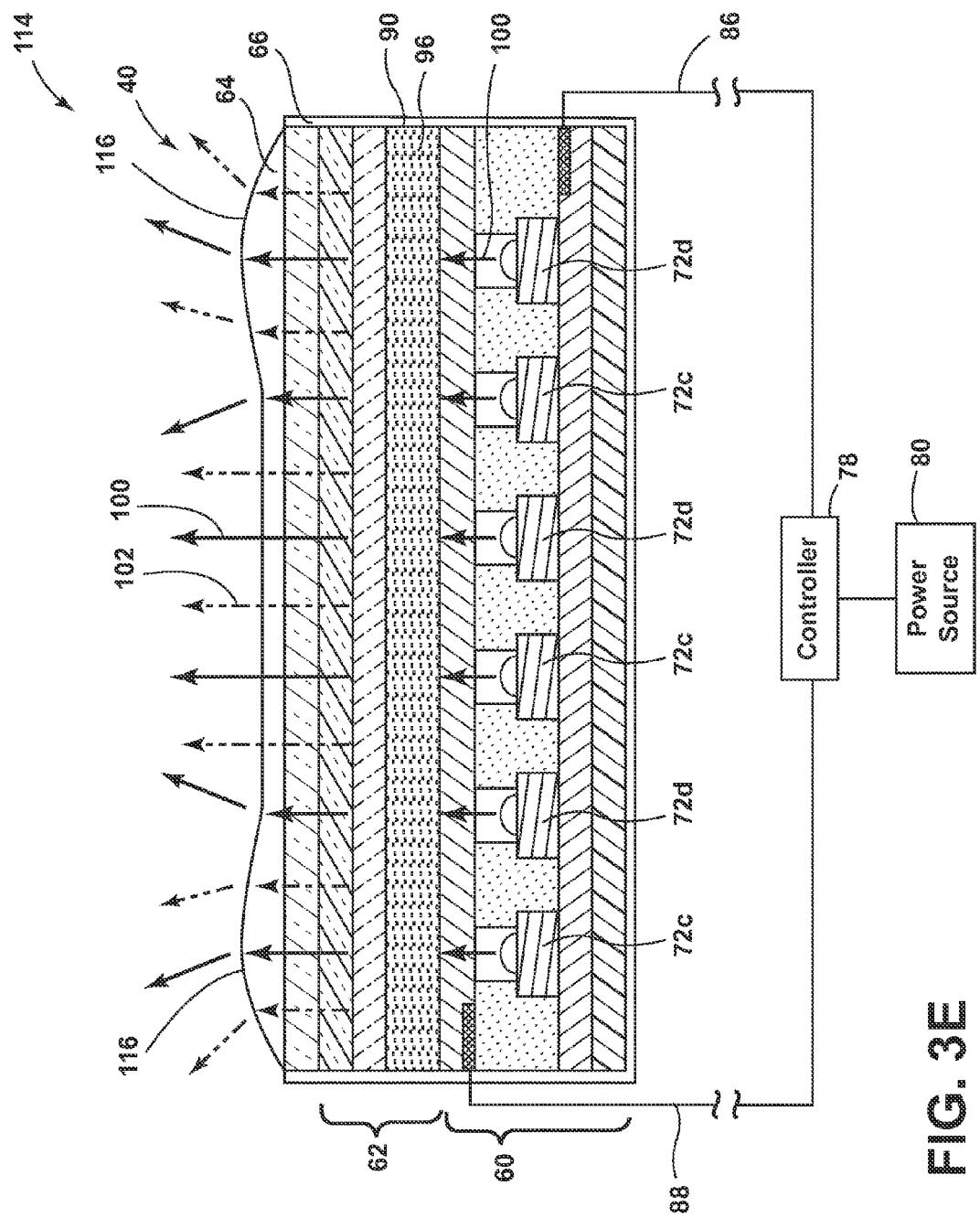
FIG. 3E is a cross-sectional view taken along line III-III of FIG. 2 illustrating an alternate light source having a luminescent structure disposed on the light source configured to convert a portion of light emitted from the light source from a first wavelength to a second wavelength, according to one embodiment.

Referring to FIG. 3E, a fourth energy conversion process 114 for generating multiple colors of light utilizing the light-producing assembly 60, such as the one described in reference to FIG. 3A, and a photoluminescent structure 62 disposed thereon is illustrated. In this embodiment, the photoluminescent structure 62 is disposed over a top portion of the light-producing assembly 60. The excitation of photoluminescent material 96 is formulated such that a portion of inputted light 100 emitted from the LED sources 72 passes through the photoluminescent structure 62 at the first wavelength (i.e., the inputted light 100 emitted from the light source 40 is not converted by the photoluminescent structure 62). The intensity of the emitted light 100 may be modified by pulse-width modulation or current control to vary the amount of inputted light 100 emitted from the LED sources 72 that passes through the photoluminescent structure 62 without converting to a second, outputted 102 wavelength. For example, if the light source 40 is configured to emit light 100 at a low level, substantially all of the light 100 may be converted to the second wavelength 102. In this configuration, a color of light 102 corresponding to the photoluminescent structure 62 may be emitted from the light-producing assembly 60. If the light source 40 is configured to emit inputted light 100 at a high level, only a portion of the first wavelength may be converted by the photoluminescent structure 62. In this configuration, a first portion of the emitted light 100 may be converted by the photoluminescent structure 62 and a second portion of the light 100 may be emitted from the light-producing assembly 60 at the first wavelength towards additional photoluminescent structures 140 disposed proximately to the light source 40. The additional photoluminescent structures 140 may luminesce in response to the light 100 emitted from the light source 40.

According to one exemplary embodiment, a first portion of the LED sources 72, exemplarily shown as LED sources 72a is configured to emit an inputted light 100 having a wavelength that excites the photoluminescent material 96 within the photoluminescent structure 62 and results in the inputted light 100 being converted into a visible light 102 of a first color (e.g., white). Likewise, a second portion of the LED sources 72, exemplarily shown as LED sources 72c, is configured to emit an inputted light 100 having a wavelength that passes through the photoluminescent structure 62 and excites additional photoluminescent structures 140 disposed proximately to the lighting system 10 thereby illuminating in a second color. The first and second colors may be visually distinguishable from one another. In this manner, LED sources 72a and 72c may be selectively activated using the controller 78 to cause the lighting system 10 to luminesce in a variety of colors.

The light-producing assembly 60 may also include optics 116 that are configured to direct light 100 emitted from the LED sources 72a, 72c and the light 102 emitted from the photoluminescent structure 62 towards pre-defined locations. For example, light 100 emitted from the LED sources 72a, 72c and the photoluminescent structure 62 may be directed and/or focused towards a desired feature and/or location proximate to the light source 40.

Figure 4:
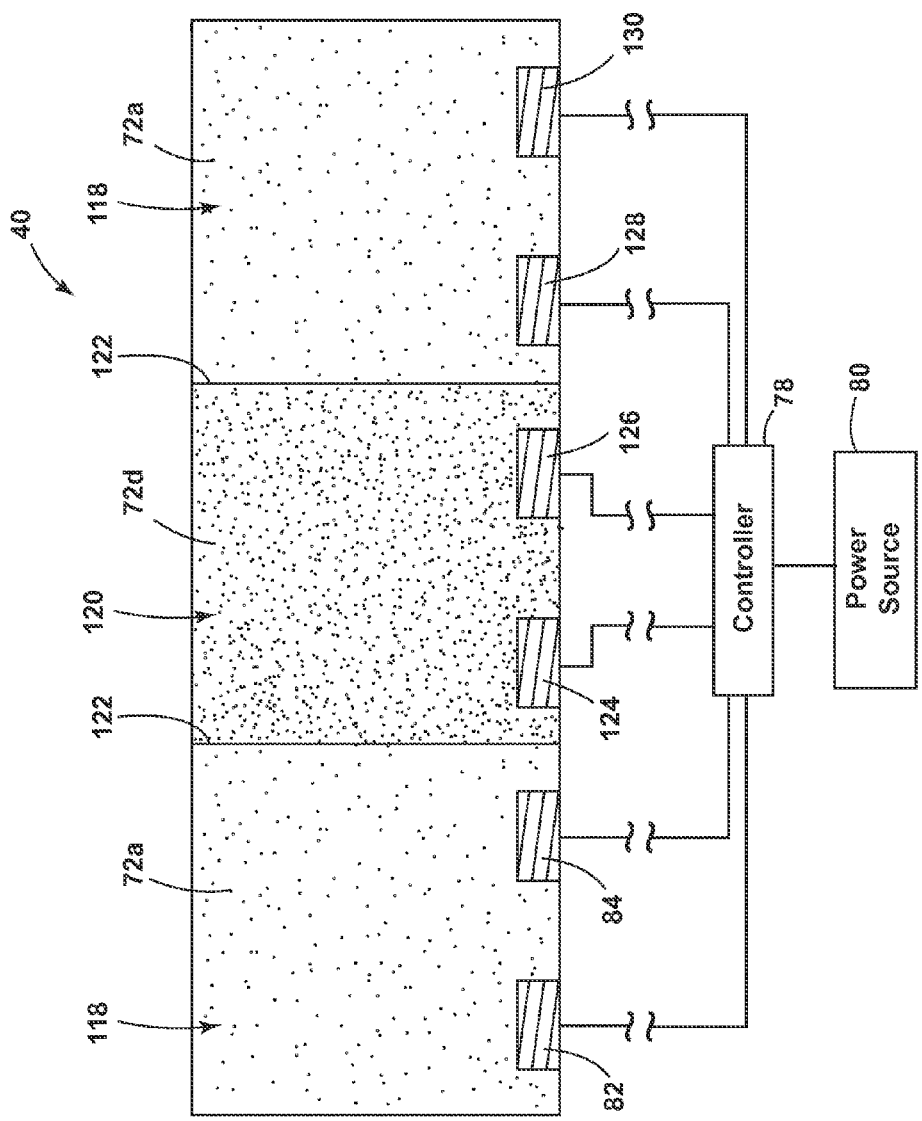
FIG. 4 illustrates a top view of a light-producing assembly, according to one embodiment, having varying types and concentrations of LED sources transversely along the light-producing assembly.

Referring to FIG. 4, a light-producing assembly 60, according to one embodiment, is illustrated from a top view having varying types and concentrations of LED sources 72a, 72d transversely along the light-producing assembly 60. As illustrated, a first portion 118 of the light-producing assembly 60 includes LED sources 72d that are configured to emit an inputted light 100 having an emission wavelength in a first color (e.g., white) spectrum. Likewise, a second portion 120 of the light-producing assembly 60 includes LED sources 72d that are configured to emit an inputted light 100 having an emission wavelength in a second color (e.g., red) spectrum. The first and second portions of the light-producing assembly 60 may be separated by insulative, or non-conductive, barriers 122 from proximately disposed portions through any means known in the art such that each portion 118, 120 may be illuminated independently of any other portion 118, 120. Further, each portion 118, 120 disposed within the light-producing assembly 60 may include a respective bus bar 82, 84, 124, 126, 128, 130 coupled to the controller 78 and configured to illuminate each respective portion 118, 120.

Preferably, the first and second colors are visually distinguishable from one another. In this manner, LED sources 72a and 72d may be selectively activated using the controller 78 to cause the LED sources 72a, 72d to illuminate in a variety of colors. For example, the controller 78 may activate only LED sources 72a to exclusively illuminate a portion 118 of the light-producing assembly 60 in the first color. Alternatively, the controller 78 may activate only LED sources 72d to exclusively illuminate a portion 120 of the light-producing assembly 60 in the second color. It should be appreciated that the light-producing assembly 60 may include any number of portions 118, 120 having varying LED sources 72a, 72d that may illuminate in any desired color. Moreover, it should also be appreciated that the portions having varying LED sources 72a, 72d may be orientated in any practicable manner and need not be disposed adjacently.

As described above, a photoluminescent structure 62 may be disposed on a portion of the light-producing assembly 60. If desired, any of the LED sources 72a, 72d may be utilized for exciting any photoluminescent material 92 disposed proximately to and/or on the light source 40.

The semiconductor ink 74 may also contain various concentrations of LED sources 72a, 72d such that the density of the LED sources 72a, 72d, or number of LED sources 72a, 72d per unit area, may be adjusted for various lighting applications. In some embodiments, the density of LED sources 72a, 72d may vary across the length of the light source 40. For example, a central portion 120 of the light-producing assembly 60 may have a greater density of LED sources 72 than peripheral portions 118, or vice versa. In such embodiments, the light source 40 may appear brighter or have a greater luminance in order to preferentially illuminate pre-defined locations. In other embodiments, the density of LED sources 72a, 72d may increase or decrease with increasing distance from a preselected point. In some embodiments, the LED sources 72a, 72d and semiconductor ink 74 may be sourced from Nth Degree Technologies Worldwide Inc.

Figure 5:
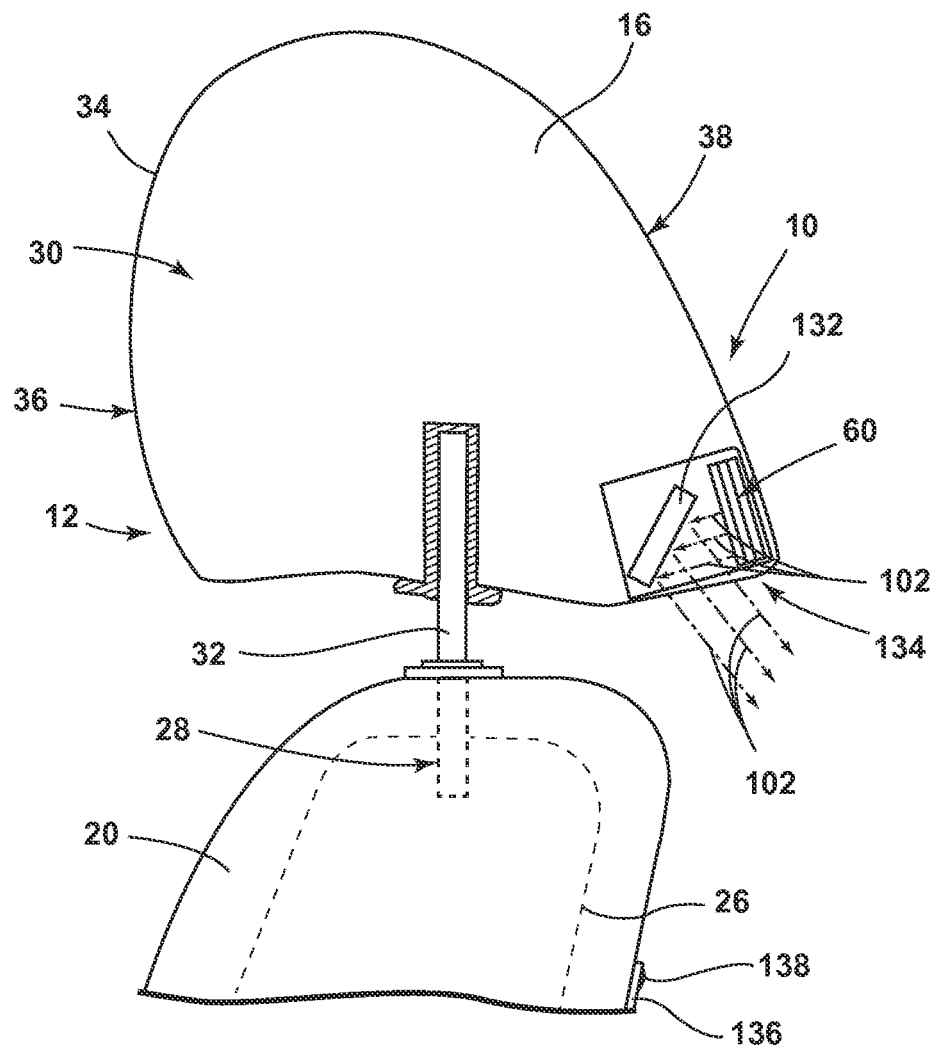
FIG. 5 illustrates a cross-sectional view of the illumination system having a light-producing assembly and a reflective structure disposed within the headrest.

Referring to FIG. 5, the illumination system incorporated in a headrest 16 is illustrated having a light-producing assembly 60 and a reflective structure 132 disposed within the headrest 16 according to one embodiment. As illustrated, the light-producing assembly 60 emits light in a vehicle forward orientation. However, it is contemplated that the emitted light may be directed in any desired direction within the headrest 16 depending on the structure and packaging of the headrest 16.

The reflective structure 132 is offset from the light-producing assembly 60 by a desired angle, which, according to one embodiment, may be between thirty five to sixty five degrees (35-65° from one another. The reflective structure 132 is configured to direct light rearward and/or downward through a portion 134 of the headrest 16. The reflective structure 132 may be rotatable through a plurality of positions such that an occupant within the vehicle 14 may control the angle at which the light outputted from the headrest 16 is directed. Alternatively, the photoluminescent structure 62 may be disposed on the reflective structure 132.

The lighting system 10 may further include a user interface 136 disposed proximately to the lighting system 10, or any other desired location within a vehicle 14. The user interface 136 may be configured such that a user may control the wavelength of light that is emitted by the LED sources 72a and/or the LED sources 72d that are illuminated. The user interface 136 may use any type of control known in the art for control the light source 40, such as, but not limited to, switches 138 (e.g., proximity sensors).

Figure 6:
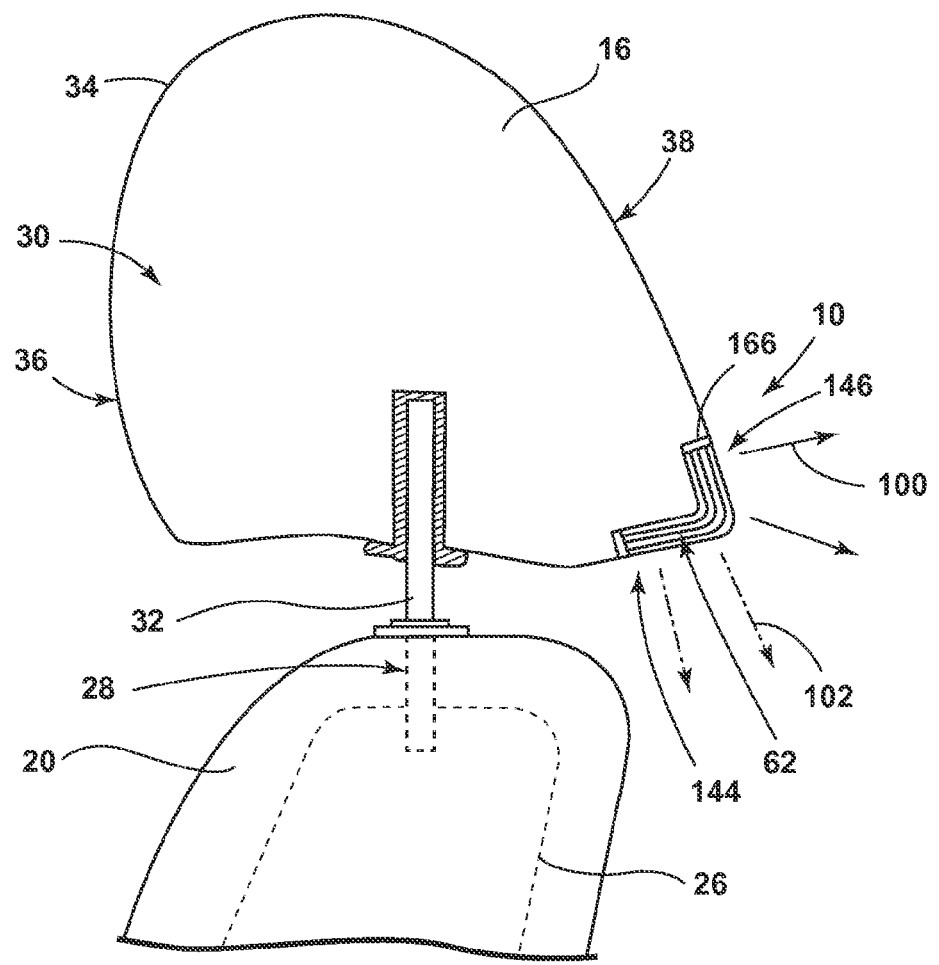
FIG. 6 illustrates a cross-sectional view of the light-producing assembly attached to an interior surface of the cover stock of the headrest.
Figure 7:
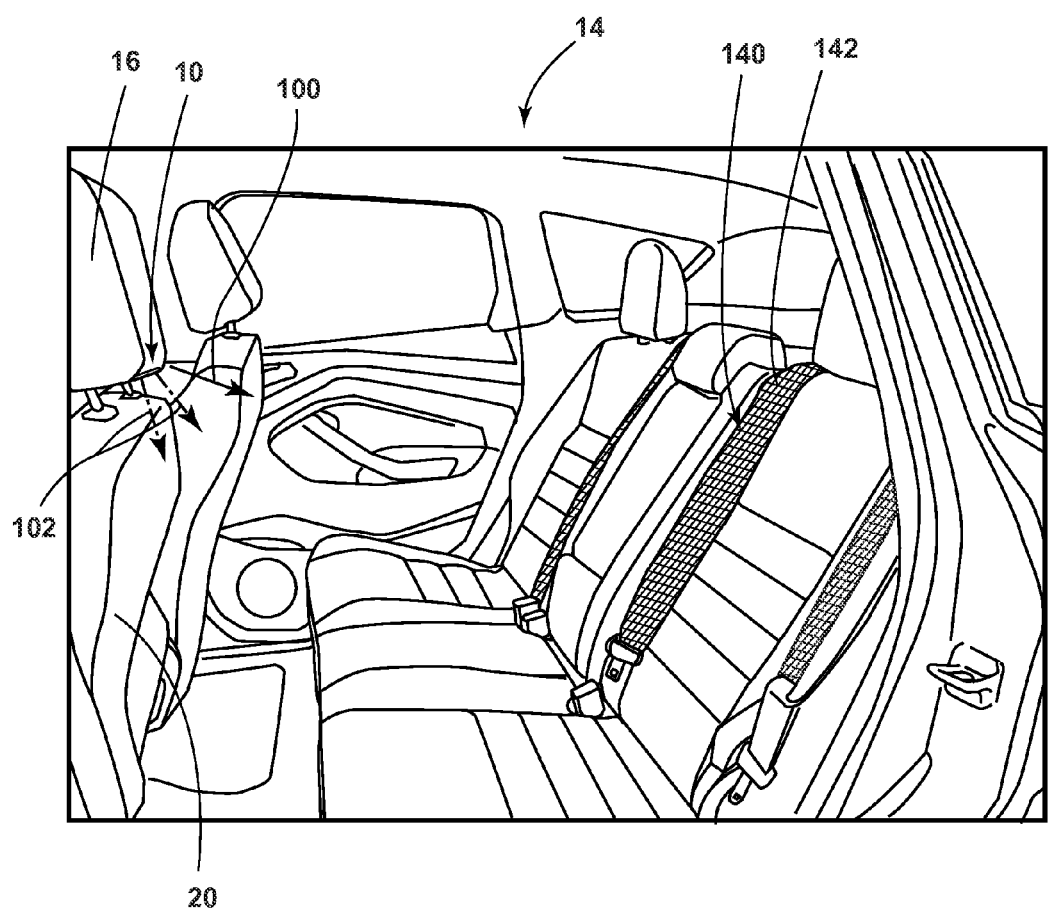
FIG. 7 illustrates a perspective view of the interior of a vehicle employing the lighting system having a first photoluminescent structure of the light-producing assembly and a second photoluminescent structure on a second feature within the vehicle.

Referring to FIGS. 6 and 7, a first photoluminescent structure 62 is disposed on the light-producing assembly 60 and a second photoluminescent structure 140 is disposed on an interior feature of the vehicle 14, such as the seatbelt 142. The light-producing assembly 60 is configured to have a first portion 144 with a first photoluminescent structure 62 thereon and a second portion 146 wherein the inputted light 100 is emitted from the headrest 16 at the first wavelength. As described above, the portion 144 of the light-producing assembly 60 having the photoluminescent structure 62 thereon converts inputted light 100 to outputted light 102 of a different wavelength. A second portion 146 of the light-producing assembly 60 emits inputted light from the headrest 16 that is then converted by the second photoluminescent structure 140 within the seatbelt 142 to an outputted light 102 of a different wavelength. The outputted light 102 may be used as a task light, a map light, and/or to illuminate any interior feature of the vehicle 14 that may difficult to see in low light conditions. It is contemplated that the use of a second photoluminescent structure 140 proximate the lighting system 10 may be disposed at any desired location and is not limited to the seatbelt 142. Additionally, the second photoluminescent structure 140 may also provide safety benefits, such as notifying an incoming occupant of specific features within the vehicle 14.

As illustrated in FIG. 6, the light-producing assembly 60 may be attached, coupled, and/or over molded to an interior surface of the cover stock shell 34 of the headrest 16. Thus, the light-producing assembly 60 may be flushly mounted to the inner surface of the cover stock shell 34 that forms a portion of the headrest 16 periphery thereby concealing the headrest 16 from the view of occupants, while also protecting the light-producing assembly 60 from physical and chemical damage arising from environmental exposure.

Figure 8:
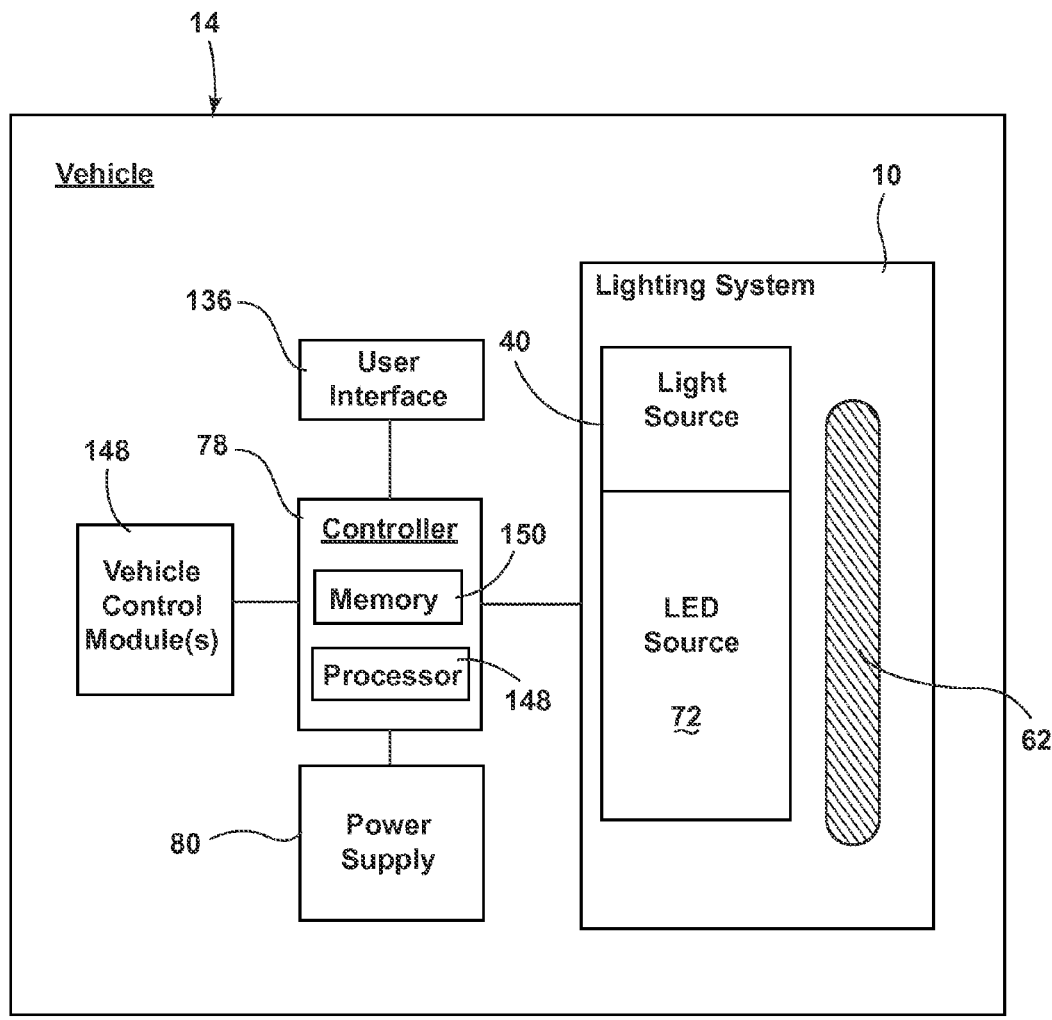
FIG. 8 is block diagram of the vehicle and the illuminated lighting system.

Referring to FIG. 8, a block diagram of a vehicle 14 is generally shown in which the lighting system 10 is implemented. The lighting system 10 includes a controller 78 in communication with the light source 40. The controller 78 may include memory 150 having instructions contained therein that are executed by a processor 148 of the controller 78. The controller 78 may provide electrical power to the light source 40, or to a respective bus bar 82, 84, via a power source 80 located onboard the vehicle 14. In addition, the controller 78 may be configured to control the light emitted 100 from each light source 40 based on feedback received from one or more vehicle control modules 148 such as, but not limited to, a body control module, engine control module, steering control module, brake control module, the like, or a combination thereof. By controlling the light emitted 100 the light source 40, the lighting system 10 may illuminate in a variety of colors and/or patterns to provide an aesthetic appearance, or may provide vehicle information to an intended observer. For example, when the lighting system 10 is illuminated, the light-producing assembly 60 may cause a portion of the headrest 16 to illuminate an area and/or feature proximate the headrest 16.

In operation, the photoluminescent structure 62 may exhibit periodic unicolor or multicolor illumination. For example, the controller 78 may prompt the light source 40 to periodically emit only the first wavelength of light 100 via the LED sources 72 to cause the photoluminescent structure 62 to periodically illuminate in the first color. Alternatively, the controller 78 may prompt the light source 40 to periodically emit only the second wavelength of light 100 via LED sources 72 to cause the photoluminescent portion to periodically illuminate in the second color. Alternatively, the controller 78 may prompt the light source 40 to simultaneously and periodically emit the first and second wavelengths of light 100 to cause the photoluminescent structure 62 to periodically illuminate in a third color defined by an additive light mixture of the first and second colors. Alternatively still, the controller 78 may prompt the light source 40 to alternate between periodically emitting the first and second wavelengths of light to cause the photoluminescent structure 62 to periodically illuminate by alternating between the first and second colors. The controller 78 may prompt the light source 40 to periodically emit the first and/or second wavelengths of light at a regular time interval and/or an irregular time interval.

In another embodiment, the lighting system 10 may include a user interface 136. The user interface 136 may be configured such that a user may control the wavelength of light 100 that is emitted by the LED sources 72 and/or the LED sources 72 that are illuminated. Such a configuration may allow a user to control which features are illuminated (e.g., task light, seat pocket light, etc.).

With respect to the above examples, the controller 78 may modify the intensity of the emitted first and second wavelengths of light by pulse-width modulation or current control. In some embodiments, the controller 78 may be configured to adjust a color of the emitted light by sending control signals to adjust an intensity or energy output level of the light source 40. For example, if the light source 40 is configured to output the first emission at a low level, substantially all of the first emission may be converted to the second emission. In this configuration, a color of light corresponding to the second emission may correspond to the color of the emitted light from the lighting system 10. If the light source 40 is configured to output the first emission at a high level, only a portion of the first emission may be converted to the second emission. In this configuration, a color of light corresponding to mixture of the first emission and the second emission may be output as the emitted light. In this way, each of the controllers 78 may control an output color of the emitted light.

Though a low level and a high level of intensity are discussed in reference to the first emission, it shall be understood that the intensity of the first emission may be varied among a variety of intensity levels to adjust a hue of the color corresponding to the emitted light from the lighting system 10. As described herein, the color of the second emission may be significantly dependent on the particular photoluminescent materials 96 utilized in the photoluminescent structure 62. Additionally, a conversion capacity of the photoluminescent structure 62 may be significantly dependent on a concentration of the photoluminescent material 96 utilized in the photoluminescent structure 62. By adjusting the range of intensities that may be output from the light source 40, the concentration, types, and proportions of the photoluminescent materials 96 in the photoluminescent structure 62 discussed herein may be operable to generate a range of color hues of the emitted light by blending the first emission with the second emission.

Accordingly, an illumination system utilizing a headrest has been advantageously provided herein. The headrest retains its structural and protective properties while providing luminescent light having both functional and decorative characteristics.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A lighting system for a vehicle headrest, comprising:
   a light source disposed on the headrest; and
   a plurality of photoluminescent structures configured to luminesce in response to excitation by the light source, wherein the plurality of photoluminescent structures are separated by a plurality of light transmissive portions such that a first portion of light emitted from the light source is converted to a second wavelength and a second portion of light emitted from the light source passes through a light transmissive portion.

2. The lighting system for a vehicle headrest of claim 1, wherein the light source comprises a plurality of printed LEDs.

3. The lighting system for a vehicle headrest of claim 2, wherein the photoluminescent structure comprises at least one photoluminescent material configured to down convert an inputted light received from at least a portion of the light sources into a visible light that is outputted to a viewable portion.

4. The lighting system for a vehicle headrest of claim 3, wherein the inputted light comprises one of blue light, violet light, and UV light.

5. The lighting system for a vehicle headrest of claim 1, wherein at least one of the photoluminescent structures is separated from and disposed proximate the headrest.

6. The lighting system for a vehicle headrest of claim 1, further comprising a controller for controlling an activation state of the light source in response to at least one vehicle-related condition.

7. The lighting system for a vehicle headrest of claim 6, wherein the controller determines at least one of a light emission intensity and a light emission duration of each of the light source.

8. A headrest for a vehicle, comprising:
   a body portion of the headrest defined by an exterior shell;
   a light source having a portion thereof disposed within the shell;
   a luminescent structure on a seatbelt configured to luminesce in response to excitation by at least a portion of the light source; and
   a controller configured to control an activation state of the light source.

9. The headrest for a vehicle of claim 8, wherein the light source comprises a printed LED.

10. The headrest for a vehicle of claim 9, wherein the luminescent structure comprises at least one luminescent material configured to down convert an inputted light received from at least a portion of the printed LED into a visible light that is outputted to a viewable portion.

11. The headrest for a vehicle of claim 10, wherein the inputted light comprises one of a blue light, violet light, and UV light.

12. The headrest for a vehicle of claim 8, wherein a plurality of luminescent structures are separated by a plurality of light transmissive portions such that a first portion of light emitted from the light source is converted to a second wavelength and a second portion of light emitted from the light source passes through a light transmissive portion.

13. The headrest for a vehicle of claim 8, wherein the controller determines at least one of a light emission intensity and a light emission duration of the light source.

14. A lighting system for a vehicle seating assembly, comprising:
   a light source disposed within the headrest of the seating assembly;
   a first photoluminescent structure disposed on the light source; and
   a second photoluminescent structure disposed on a component separate from and disposed proximate the seating assembly, wherein the first and second photoluminescent structures are configured to luminesce in response to excitation by light output from at least a portion of the light source.

15. The lighting system for a vehicle of claim 14, wherein the light sources comprise a plurality of printed LEDs.

16. The lighting system for a vehicle of claim 15, wherein the first photoluminescent structure comprises at least one photoluminescent material configured to down convert an inputted light received from at least a portion of the light sources into a visible light that is outputted to a viewable portion.

17. The lighting system for a vehicle of claim 16, wherein the inputted light comprises one of blue light, violet light, and UV light.

18. The lighting system for a vehicle of claim 14, wherein the first photoluminescent structure illuminates in a first color and a second photoluminescent structure illuminates in a second color.

19. The lighting system for a vehicle of claim 14, further comprising a controller for controlling an activation state of the light source in response to at least one vehicle-related condition.

20. The lighting system for a vehicle of claim 19, wherein the controller determines at least one of a light emission intensity and a light emission duration of the light source.

* * * * *